United States Patent
Orihara

(10) Patent No.: US 10,971,795 B2
(45) Date of Patent: Apr. 6, 2021

(54) ANTENNA DEVICE

(71) Applicant: DEXERIALS CORPORATION, Tokyo (JP)

(72) Inventor: Katsuhisa Orihara, Tochigi (JP)

(73) Assignee: DEXERIALS CORPORATION, Tokyo (JP)

(*) Notice: Subject to any disclaimer, the term of this patent is extended or adjusted under 35 U.S.C. 154(b) by 155 days.

(21) Appl. No.: 16/302,608

(22) PCT Filed: May 22, 2017

(86) PCT No.: PCT/JP2017/018984
§ 371 (c)(1),
(2) Date: Nov. 16, 2018

(87) PCT Pub. No.: WO2017/208879
PCT Pub. Date: Dec. 7, 2017

(65) Prior Publication Data
US 2019/0157744 A1    May 23, 2019

(30) Foreign Application Priority Data
May 30, 2016    (JP) .................................. 2016-107529

(51) Int. Cl.
*H01Q 7/06* (2006.01)
*H01Q 7/00* (2006.01)
(Continued)

(52) U.S. Cl.
CPC .......... *H01Q 1/2225* (2013.01); *H01Q 1/243* (2013.01); *H01Q 7/00* (2013.01); *H01Q 7/06* (2013.01); *H04B 5/0081* (2013.01)

(58) Field of Classification Search
CPC ........ H01Q 1/2225; H01Q 1/243; H01Q 7/00; H01Q 7/06; H01Q 1/22; H04B 5/0081
(Continued)

(56) References Cited

U.S. PATENT DOCUMENTS

2012/0098711 A1* 4/2012 Yosui ..................... H01Q 1/243
343/702
2012/0262348 A1* 10/2012 Kubo ................... H01Q 1/2216
343/702
(Continued)

FOREIGN PATENT DOCUMENTS

CN    102971909 A    3/2013
CN    104993215 A    10/2015
(Continued)

OTHER PUBLICATIONS

Dec. 9, 2019 Office Action issued in Chinese Patent Application No. 201780030556.7.
(Continued)

*Primary Examiner* — Hai V Tran

(57) ABSTRACT

An antenna device incorporated in an electronic apparatus and communicating with an external device via an electromagnetic field signal, including: an antenna coil inductively coupled to the external device and provided by winding around a conducting wire so conducting wires opposing in width direction via an opening will be close together; and a sheet-like conductor at a surface of the antenna coil opposite a surface of the antenna coil opposing the external device, wherein the coil is divided into two parts, i.e. one side part wherein the conducting wire is wound around in one direction and other side part wound in other direction, via a center line longitudinally traversing the opening, and the conductor is configured with a conductor side opening overlapped only with the other side part of the antenna coil, and a slit formed between the conductor side opening and any outer edge of the sheet-like conductor.

14 Claims, 12 Drawing Sheets

(51) Int. Cl.
*H01Q 1/22* (2006.01)
*H04B 5/00* (2006.01)
*H01Q 1/24* (2006.01)

(58) Field of Classification Search
USPC .......................................................... 343/788
See application file for complete search history.

(56) References Cited

U.S. PATENT DOCUMENTS

| | | | | |
|---|---|---|---|---|
| 2013/0147670 | A1* | 6/2013 | Nakano | H01Q 1/243 343/702 |
| 2013/0307746 | A1* | 11/2013 | Nakano | H01Q 1/2225 343/850 |
| 2014/0218261 | A1* | 8/2014 | Ito | H01Q 7/06 343/866 |
| 2015/0249282 | A1* | 9/2015 | Orihara | H01Q 7/00 343/702 |
| 2016/0086074 | A1* | 3/2016 | Nakano | G06K 19/0723 235/492 |
| 2016/0268674 | A1 | 9/2016 | Orihara | |
| 2016/0351991 | A1* | 12/2016 | Chen | H01Q 1/48 |

FOREIGN PATENT DOCUMENTS

| | | |
|---|---|---|
| JP | 2012-065368 A | 3/2012 |
| JP | 5135450 B2 | 2/2013 |
| JP | 5673854 B2 | 2/2015 |
| JP | 2015-053532 A | 3/2015 |
| JP | 2015-095707 A | 5/2015 |

OTHER PUBLICATIONS

English translation of Dec. 9, 2019 Office Action issued in Chinese Patent Application No. 201780030556.7.
Aug. 8, 2017 International Search Report issued in International Patent Application No. PCT/JP2017/018984.

* cited by examiner

ANTENNA DEVICE

BACKGROUND OF THE INVENTION

Field of the Invention

The present invention relates to an antenna device incorporated in an electronic apparatus and communicating with an external device such as a transmitter via an electromagnetic field signal. The present application claims priority based on Japanese Patent Application No. 2016-107529 filed in Japan on May 30, 2016, which is incorporated by reference herein.

Description of Related Art

In electronic apparatuses such as portable telephone, an antenna module for RFID (Radio Frequency Identification) has been used to mount a function of Near Field Communication. This antenna module communicates with an antenna coil mounted on a transmitter such as a reader/writer by using inductive coupling. That is, in this antenna module, magnetic field from the reader/writer is received by an antenna coil and thereby converted into electric power, which can drive an IC which functions as a communication processing unit.

To reliably perform communication, the antenna module is required to receive, at the antenna coil, magnetic flux equal to or more than a certain value from the reader/writer. For this reason, in an antenna module according to conventional example, a loop coil is provided in a housing of a portable telephone or the like, and this coil receives magnetic flux from the reader/writer. In the antenna module incorporated in an electronic apparatus such as a portable telephone, magnetic flux from the reader/writer are caused to bounce back by eddy current occurring because a metal plate such as a battery pack or a substrate inside the apparatus receives a magnetic field from the reader/writer. The magnetic flux bounced back by the metal plate or the substrate flows toward outer periphery to bypass the metal plate or the substrate, so magnetic field at the outer periphery tends to be strong and magnetic field tends to be weak near a center of the metal plate and the substrate.

In Patent Literature 1, it is proposed to arrange an antenna coil at an end of a metal plate such as a battery pack or a substrate in an electronic apparatus, in order to improve communication efficiency of NFC (Near Field Communication) antenna module used by incorporated in the electronic apparatus using such property. In addition, in Patent Literature 2, it is proposed to arrange a sheet-like second conductor to bridge between a substrate and an antenna coil, when it is not possible to arrange the antenna coil near the substrate by a limitation according to a layout.

Patent Literature 1: JP 5135450 B
Patent Literature 2: JP 2015-053532 A

SUMMARY OF THE INVENTION

However, in RFID such as NFC or FeliCa, it is preferable that an operation point for contactless communication with an external device will be at a peak of coupling coefficient, in order to secure higher communication performance with the external device. In addition, due to structural limitation of a portable electronic apparatus mounting RFID, a part of the antenna coil to be a peak of coupling coefficient will be shielded, and it is concerned that communication performance with the external device will not be secured sufficiently. In other words, it is preferable to be able to adjust the operation point for contactless communication with the external device to be at a peak of coupling coefficient, in order to secure higher communication performance with the external device.

The present invention is proposed considering these problems, and the purpose of the present invention is to provide new and improved antenna device capable of securing higher communication performance by adjusting the operation point for contactless communication with the external device to be at a peak of coupling coefficient.

One embodiment of the present invention is an antenna device incorporated in an electronic apparatus and communicating with an external device via an electromagnetic field signal, comprising: an antenna coil inductively coupled to the external device and provided by winding around a conducting wire such that conducting wires opposing in width direction via an opening will be close to each other; and a sheet-like conductor provided at a surface of the antenna coil opposite to a surface of the antenna coil opposing to the external device, wherein the antenna coil is divided into two parts, i.e. one side part in which the conducting wire is wound around in one direction and other side part in which the conducting wire is wound around in other direction, via a center line longitudinally traversing the opening, and the sheet-like conductor is configured to be provided with a conductor side opening overlapped only with the other side part of the antenna coil, and a slit formed between the conductor side opening and any outer edge of the sheet-like conductor.

According to one embodiment of the present invention, by overlapping the conductor side opening provided at desired position of the sheet-like conductor only with the other side part of the antenna coil, and also, by providing a slit connecting the conductor side opening and the outer edge of the sheet-like conductor, the operation point for contactless communication with the external device is adjusted to be at a peak of coupling coefficient, so it is possible to secure higher communication performance.

At this time, in one embodiment of the present invention, the conductor side opening may have a size approximately identical with a size of the other side part of the antenna coil.

In this way, a loop tends to be formed as magnetic flux from the external device passes through the conductor side opening, so it is possible to secure higher communication performance.

In addition, in one embodiment of the present invention, the conductor side opening may be provided at center side near a center of the sheet-like conductor.

In this way, it will be possible to collect more magnetic flux around the conductor side opening, so it is possible to secure higher communication performance.

In addition, in one embodiment of the present invention, the sheet-like conductor may be a second conductor bridging the antenna coil and a first conductor composed of a metal plate provided at the electronic apparatus.

In this way, it will be easy to adjust communication operation point to desired position, so it is possible to secure higher communication performance.

In addition, in one embodiment of the present invention, the sheet-like conductor may be configured as a part of a metal plate provided at the electronic apparatus.

In this way, it is possible to secure higher communication performance by using internal structure of the electronic apparatus.

In addition, in one embodiment of the present invention, a magnetic sheet formed from a magnetic substance may be arranged at a position between the other side part of the antenna coil and the conductor side opening.

In this way, it is possible to secure higher communication performance as magnetic flux from the external device tends to be introduced into the opening of the antenna coil, by arranging the magnetic sheet in a direction for releasing the magnetic flux.

In addition, in one embodiment of the present invention, the magnetic sheet may be arranged also at a surface side of the one side part of the antenna coil opposing to the external device.

In this way, it is possible to secure higher communication performance as it will be easier to introduce magnetic flux from the external device directly into the opening of the antenna coil.

In addition, in one embodiment of the present invention, the magnetic sheet may be arranged at the position between the other side part of the antenna coil and the conductor side opening, and also, arranged to overlap with a surface of the one side part of the antenna coil opposing to the external device, by inserting the magnetic sheet into the opening of the antenna coil.

In this way, it is possible to secure higher communication performance as it will be easy to introduce magnetic flux from the external device directly into the opening of the antenna coil.

As explained in the above, according to the present invention, it is possible to secure higher communication performance by enabling to adjust the operation point for contactless communication with the external device to be at a peak of coupling coefficient.

DETAILED DESCRIPTION OF THE INVENTION

Hereinafter, explaining in detail about preferred embodiments of the present invention. In addition, the embodiments explained in below will not unjustly limit the content of the present invention described in claims, and it is not limited that all the structures explained in the embodiments are necessary as means for solving the problem of the present invention.

Figure 1:
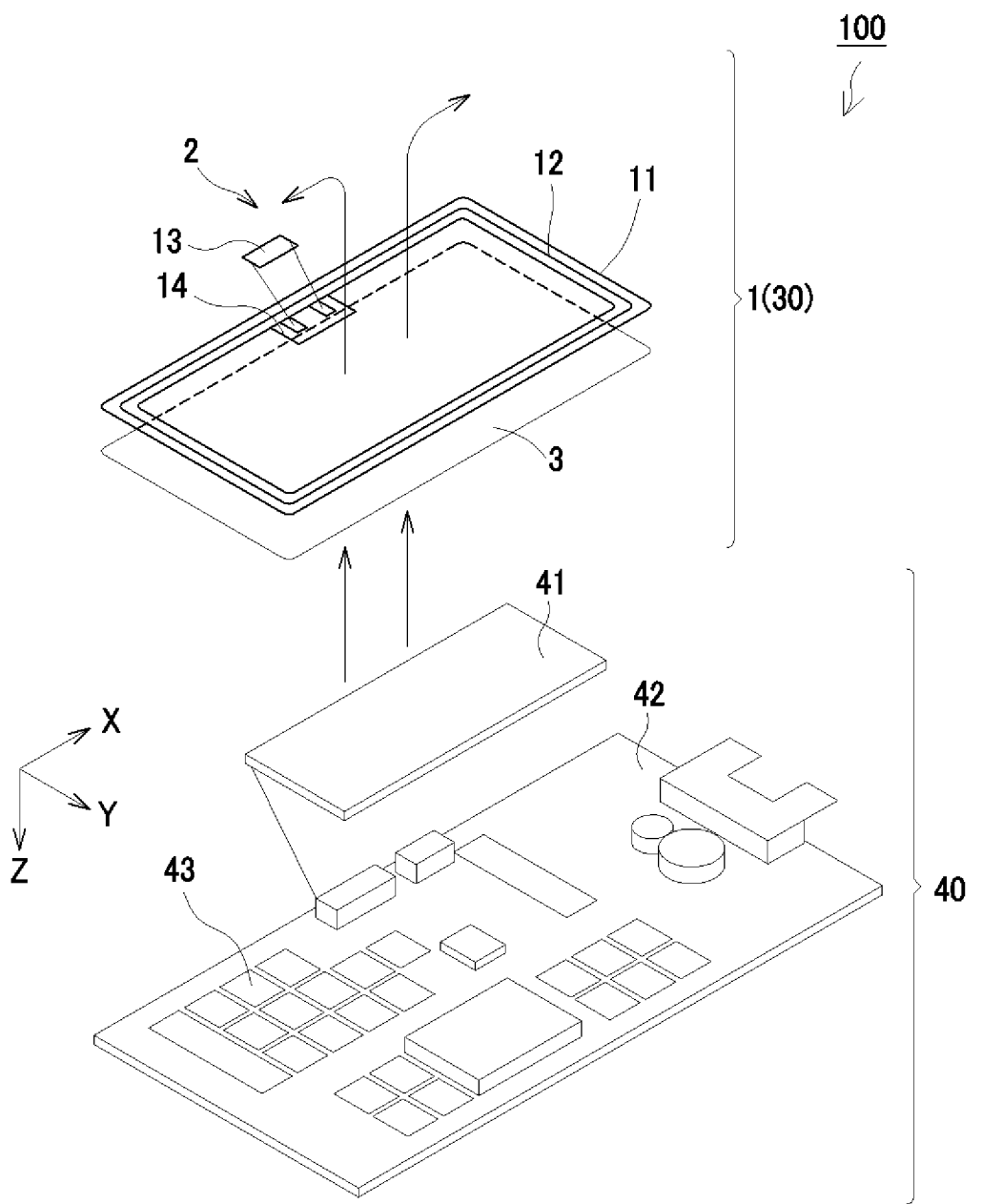
FIG. 1 is a perspective view illustrating a schematic structure of a wireless communication system applying an antenna device relating to one embodiment of the present invention.

At first, explaining about a structure of an antenna device relating to one embodiment of the present invention, using the drawings. FIG. 1 is a perspective view illustrating a schematic structure of a wireless communication system applying an antenna device relating to one embodiment of the present invention.

An antenna device 1 relating to this embodiment is a device incorporated in an electronic apparatus 30 and communicating with an external device via electromagnetic field signal, and for example, it is used by incorporated in a wireless communication system 100 for RFID as illustrated in FIG. 1.

As illustrated in FIG. 1, the wireless communication system 100 comprises: the antenna device 1 provided in the electronic apparatus 30; and a reader/writer 40 which is the external device for accessing to the antenna device 1. Here, the antenna device 1 and the reader/writer 40 are arranged to be opposed to each other in XY plane of three-dimensional orthogonal coordinate system XYZ illustrated in FIG. 1.

The reader/writer 40 functions as a transmitter for transmitting magnetic field in Z axis direction with respect to the antenna device 1 opposing to each other in XY plane, and concretely, the reader/writer 40 comprises: an antenna 41 for transmitting magnetic field to the antenna device 1; and a control board 42 for communicating with the antenna device 1 inductively coupled via the antenna 41.

In other words, in the reader/writer 40, the control board 42 electrically connected to the antenna 41 is arranged. In this control board 42, a control circuit 43 consisting of electronic components such as one or plurality of integrated circuit chips is mounted. This control circuit 43 performs various processing based on data received from the antenna device 1.

For example, when transmitting data to the antenna device 1, the control circuit 43 encodes data, modulates carrier wave of a predetermined frequency (for example, 13.56 MHz) based on encoded data, amplifies modulated modulation signal, and drives the antenna 41 by amplified modulation signal. In addition, when reading out data from the antenna device 1, the control circuit 43 amplifies modulation signal of data received by the antenna 41, demodulates amplified modulation signal of data, and decodes demodulated data.

In addition, in the control circuit 43, an encoding system and a modulating system used in general reader/writer are used, and for example, Manchester encoding system and ASK (Amplitude Shift Keying) modulating system are used. In addition, it is explained about the antenna device or the like in a contactless communication system in below, but same applies to a contactless charging system such as Qi.

For example, the antenna device 1 is incorporated inside of a housing of the electronic apparatus 30 such as portable telephone arranged to be opposed to the reader/writer 40 in XY plane. In this embodiment, the antenna device 1 comprises: an antenna module 2 having an antenna substrate 11 mounted with an antenna coil 12 capable of communicating with inductively coupled reader/writer 40; a communication processing unit 13 driven by current flowing in the antenna coil 12 for communicating with the reader/writer 40; and a metal plate 3.

The antenna module 2 is arranged inside of the housing of the electronic apparatus 30, and communicates with inductively coupled reader/writer 40. As illustrated in FIG. 1, in this embodiment, the antenna module 2 comprises: the antenna substrate 11, the communication processing unit 13 and a connection 14.

In the antenna substrate 11, for example, the antenna coil 12 formed by patterning processing a flexible conducting wire 12a (refer to FIG. 2A) such as a flexible flat cable, and a terminal area 14 for electrically connecting the antenna coil 12 and the communication processing unit 13, are mounted.

The antenna coil 12 will be magnetically coupled with the reader/writer 40 by inductive coupling when receiving magnetic field transmitted from the reader/writer 40, and the antenna coil 12 is having a function to receive modulated electromagnetic wave and to supply received signal to the communication processing unit 13 via the terminal area 14. In addition, about detailed explanation of configuration of the antenna coil 12, it will be described later.

The communication processing unit 13 is driven by current flowing in the antenna coil 12 and communicates with the reader/writer 40. Concretely, the communication processing unit 13 demodulates received modulation signal, decodes demodulated data, and writes decoded data into internal memory incorporated in the communication processing unit 13. In addition, the communication processing unit 13 reads out data to be transmitted to the reader/writer 40 from the internal memory, encodes read out data, modulates carrier wave based on encoded data, and transmits modulated electric wave to the reader/writer 40 via the antenna coil 12 magnetically coupled by inductive coupling. In addition, the communication processing unit 13 may be driven by electric power supplied from power supplying means such as external power source or battery pack incorporated in the electronic apparatus, instead of electric power flowing in the antenna coil 12.

The metal plate 3 is arranged inside of the housing of the electronic apparatus 30, and becomes a first conductor opposing to the reader/writer 40, which is the external device. The metal plate 3 is arranged inside of the housing of the electronic apparatus, for example a portable phone, a smart phone, a tablet PC or the like, and configures the first conductor opposing to the reader/writer 40 at the time of communication of the antenna module 2. For example, an internal structure such as a metallic cover attached to inner surface of a housing of smart phone, a metal housing of battery pack contained in smart phone, or a metal plate arranged at back surface of liquid crystal module of tablet PC corresponds to the first conductor.

The metal plate 3, which is the above internal structure, flows electricity relatively well, so eddy current occurs when AC magnetic field is applied from outside and magnetic field will be bounced back. By checking magnetic field distribution when such AC magnetic field is applied from outside, it is having a feature that magnetic field is strong at outer edge side of the metal plate 3 opposing to the reader/writer 40. Therefore, conventionally, the antenna coil 12 of the antenna module 2 was arranged at outer edge side of the metal plate 3 such as metal housing arranged in the housing of the portable phone 30, in order to secure excellent communication characteristics with the reader/writer 40, while miniaturizing the electronic apparatus 30 when incorporating the antenna module 2 in the electronic apparatus 30 such as the portable phone.

However, along with multifunctionalization and miniaturization of the electronic apparatus 30, there is a case that the antenna coil 12 cannot be arranged at outer edge side of the metal plate 3, as sufficient space for arranging the antenna coil 12 at outer edge side of the metal plate 3 is not secured in the housing. In addition, there is a case that communication performance with the external device 40 is not secured, as a part of the antenna coil 12 to be a peak of coupling coefficient k is shielded, due to structural limitation of portable electronic apparatus mounting RFID. In other words, along with multifunctionalization and miniaturization of the electronic apparatus 30, and also, by the structural limitation of the electronic apparatus 30, it is concerned that it is not possible to sufficiently improve communication characteristics of the antenna using magnetic shielding effect by the metal plate 3.

As a result of keen examination for achieving the purpose of the present invention, the present inventors have found that it is possible to secure antenna communication characteristics by more excellent magnetic shielding effect than when arranging the antenna coil 12 at outer edge side of the metal plate 3, as the operation point for contactless communication with the external device 40 will be adjusted to be at a peak of coupling coefficient k, by arranging an opening at inner side of the metal plate 3, and also, by connecting the opening and outer edge of the metal plate 3 by a slit and by overlapping the other side part of the antenna coil 12 with the opening. As a result of further research based on such knowledge, the present invention has been completed.

Figure 2A:
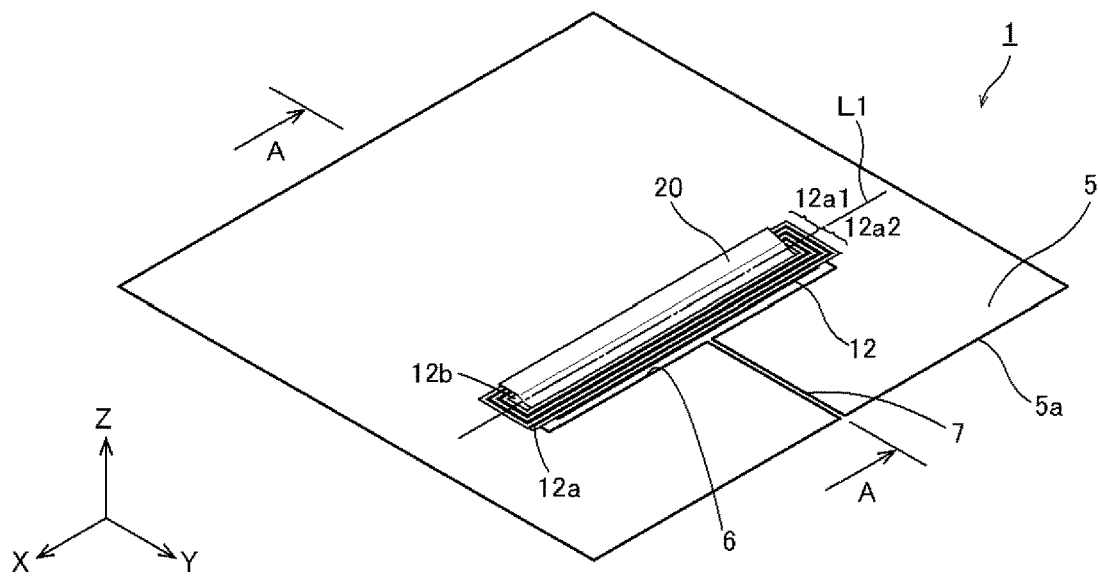
FIG. 2A is a perspective view illustrating an example of a schematic structure of an antenna device relating to one embodiment of the present invention.

Next, explaining about a configuration of an antenna device relating to one embodiment of the present invention, using drawings. FIG. 2A is a perspective view illustrating an example of a schematic structure of an antenna device relating to one embodiment of the present invention, FIG. 2B is a sectional view along line A-A of FIG. 2A, and FIG.

2C is a perspective view of a sheet-like conductor excluding an antenna coil of the antenna device illustrated in FIG. 2A.

Figure 2B:
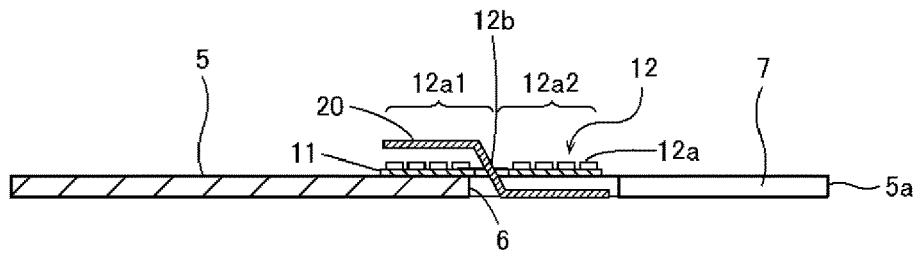
FIG. 2B is a sectional view along line A-A of FIG. 2A.
Figure 2C:
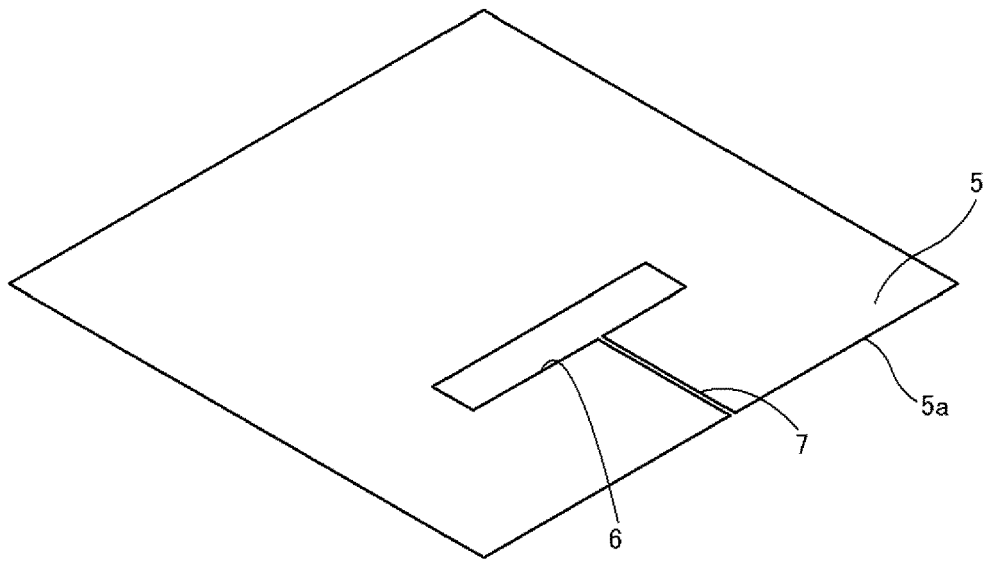
FIG. 2C is a perspective view of a sheet-like conductor excluding an antenna coil of the antenna device illustrated in FIG. 2A.

As illustrated in FIGS. 2A and 2B, an antenna device 1 of this embodiment comprises: an antenna coil 12 provided by winding around a conducting wire 12a such that conducting wires 12a opposing in width direction (Y direction) via an opening 12b will be close to each other; and a sheet-like conductor 5 provided at a surface of the antenna coil 12 opposite to a surface of the antenna coil 12 opposing to an external device 40.

In this embodiment, the antenna coil 12 is an elongated approximately rectangular shaped coil divided into two parts, i.e. one side part 12a1 in which the conducting wire 12a is wound around in one direction and other side part 12a2 in which the conducting wire 12a is wound around in other direction, via a center line L1 longitudinally traversing the opening 12b at center side. In addition, the antenna coil 12 is arranged such that a main surface in which the conducting wire 12a is wound around will be opposed to a reader/writer 40 in XY plane illustrated in FIG. 1 at the time of communication. Further, a magnetic sheet 20 formed from a magnetic substance is provided to be inserted into the opening 12b of the antenna coil 12 such that the magnetic sheet 20 is arranged at a position between the other side part 12a2 and a conductor side opening 6, and also, arranged to overlap with a surface of the one side part 12a1 opposing to the external device 40, in order to directly introduce magnetic flux from the external device 40 into the opening 12b of the antenna coil 12 easily.

The sheet-like conductor 5 is a metallic sheet having a size bigger than a contour of the antenna coil 12, and configured to be provided with the conductor side opening 6 having a size to overlap only with the other side part 12a2 of the antenna coil 12, and a slit 7 formed between the conductor side opening 6 and a tip of an outer edge 5a of the sheet-like conductor 5. In this embodiment, the metal plate 3 provided in the electronic apparatus 30 is used as the sheet-like conductor 5, and the sheet-like conductor 5 is configured such that an opening to be the conductor side opening 6 is arranged at inner side of the metal plate 3, and also, that the conductor side opening 6 and the outer edge 5a of the metal plate 3 (sheet-like conductor 5) are connected by the slit 7, and that the conductor side opening 6 is overlapped with the other side part 12a2 of the antenna coil 12. In other words, in this embodiment, the sheet-like conductor 5 configures a part of the metal plate 3 provided in the electronic apparatus 30.

The slit 7 is a narrow slit long in longitudinal direction with respect to width direction, and the slit 7 is formed to connect between the conductor side opening 6 and a tip of the outer edge 5a of the sheet-like conductor 5. By arranging the slit 7, a loop of eddy current flowing through the sheet-like conductor 5 (metal plate 3) at the time of communication will be shut off, so occurrence of eddy current is prevented, and it is possible to inhibit loss of magnetic flux passing through. In addition, it is fine as long as it is possible to prevent occurrence of eddy current at the sheet-like conductor 5 (metal plate 3), so width of the slit 7 is not limited. In addition, the slit 7 may be arranged to connect the conductor side opening 6 with any of the outer edge 5a of the sheet-like conductor 5, so the slit 7 may be configured to connect the conductor side opening 6 with any of both sides of the outer edge 5a of the sheet-like conductor 5.

As mentioned above, in this embodiment, the antenna device 1 is configured to provide the conductor side opening 6 having a size approximately equal to a size of the other side part 12a2 of the antenna coil 12 at a desired position of the sheet-like conductor 5 (metal plate 3), and also, to provide the slit 7 for connecting the conductor side opening 6 with the outer edge 5a of the sheet-like conductor 5, and further, to provide the antenna coil 12 at inner side of the sheet-like conductor 5 such that the other side part 12a2 of the antenna coil 12 is overlapped with the conductor side opening 6. By configuring as the above, a loop is formed as magnetic flux from the reader/writer 40 passes through the conductor side opening 6 provided at the sheet-like conductor 5 along the magnetic sheet 20, so communication performance as antenna is improved. In addition, "a size approximately equal to" mentioned in here is not limited to a size completely equal to, and for example, it means a size that some deviation is allowed in a range not influencing communication performance.

In addition, by arranging the conductor side opening 6 at desired position of the sheet-like conductor 5, the operation point for contactless communication with the external device 40 such as reader/writer will be adjusted to be at a peak of coupling coefficient k between both coils, so it will be possible to secure higher communication performance. In other words, in this embodiment, by arranging the conductor side opening 6 at desired position of the metal plate 3 which will be the sheet-like conductor 5 by using the metal plate 3, which is the internal structure of the electronic apparatus 30, the operation point for contactless communication will be adjusted to be at a peak of coupling coefficient k between both coils, so higher communication performance is secured. Especially, by arranging the conductor side opening 6 at center side near a center of the sheet-like conductor 5, it will be possible to collect more magnetic flux around the conductor side opening 6, so it will be possible to secure higher communication performance.

In addition, in this embodiment, the magnetic sheet 20 is arranged at a position between the other side part 12a2 and the conductor side opening 6, and arranged to overlap with a surface of the one side part 12a1 opposing to the external device 40, by inserting the magnetic sheet 20 into the opening 12b of the antenna coil 12, but it is sufficient if the magnetic sheet 20 is arranged at least at a position between the other side part 12a2 of the antenna coil 12 and the conductor side opening 6.

Figure 3A:
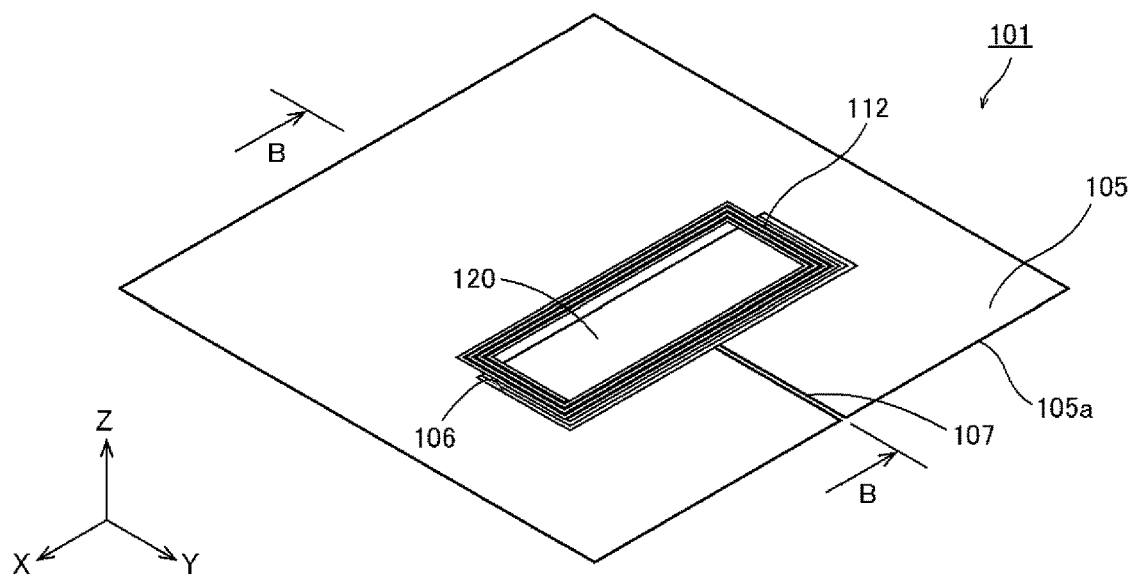
FIG. 3A is a perspective view illustrating an example of a schematic structure of a variant of an antenna device relating to one embodiment of the present invention.
Figure 3B:
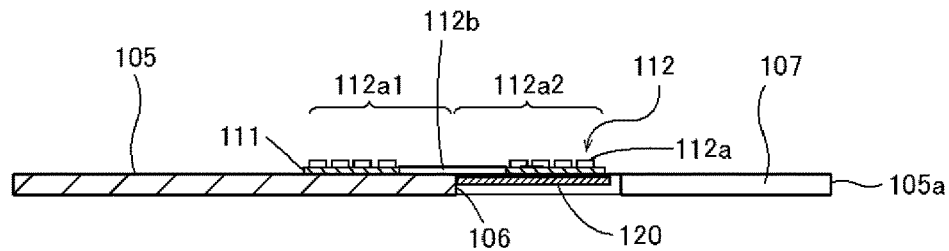
FIG. 3B is a sectional view along line B-B of FIG. 3A.
Figure 3C:
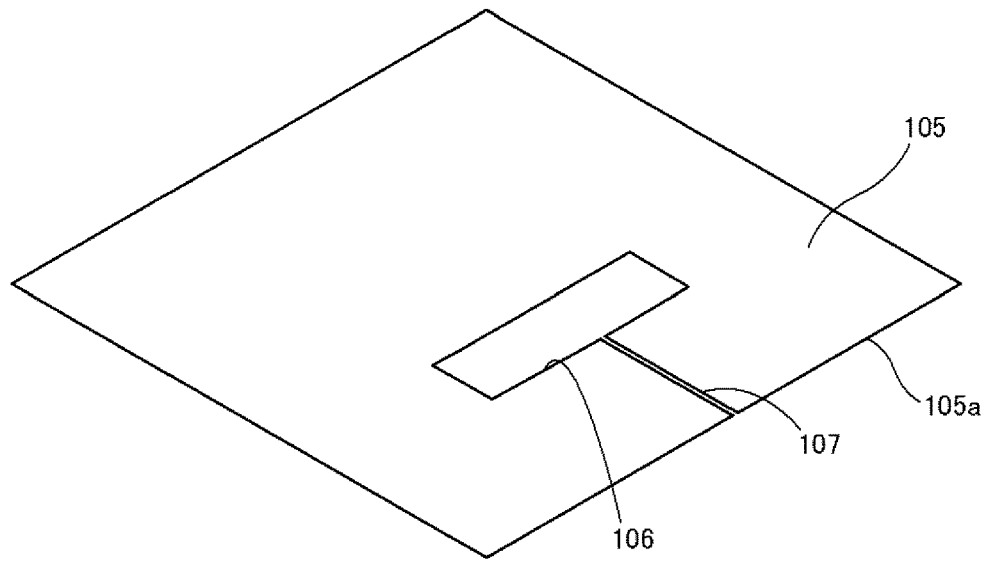
FIG. 3C is a perspective view of a sheet-like conductor excluding an antenna coil of the antenna device illustrated in FIG. 3A.

For example, as illustrated in FIGS. 3A to 3C, when it is configured that a magnetic sheet 120 is arranged only at a position between other side part 112a2 of an antenna coil 112 and a conductor side opening 106, and also, that a slit 107 is formed to connect between the conductor side opening 106 and an outer edge 105a of a sheet-like conductor 105, and that the antenna coil 112 is arranged at inner side of the sheet-like conductor 105 such that the other side part 112a2 of the antenna coil 112 is overlapped with the conductor side opening 106, it is also having the above-mentioned action and effect.

Figure 4A:
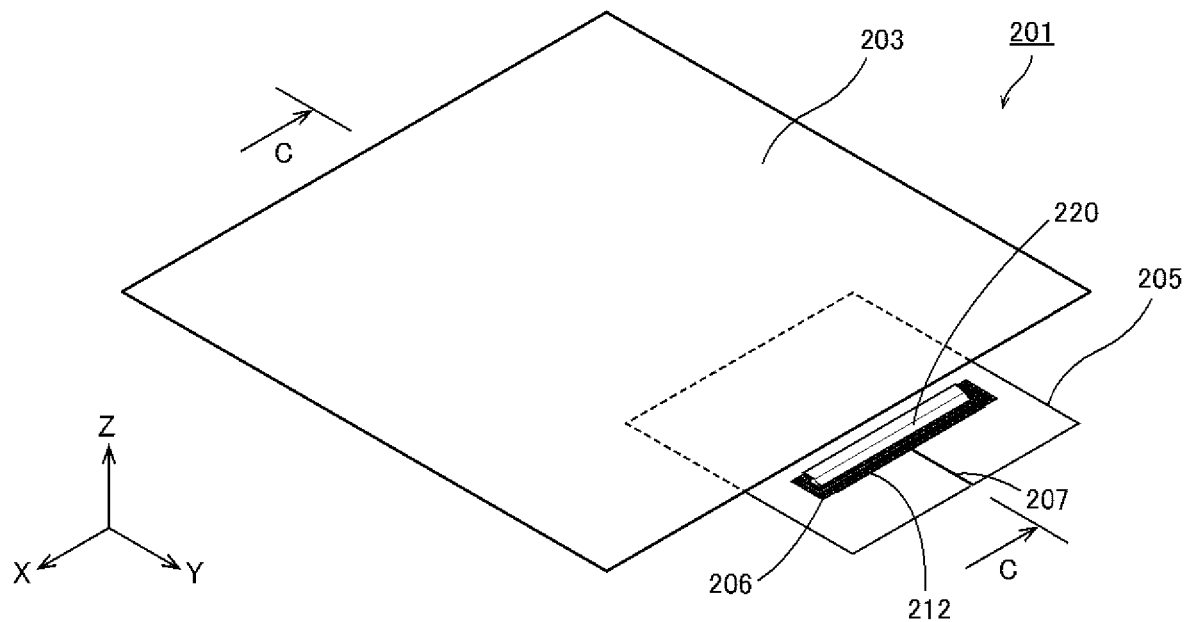
FIG. 4A is a perspective view illustrating an example of a schematic structure of an antenna device relating to other embodiment of the present invention.

Next, explaining about a configuration of an antenna device relating to other embodiment of the present invention using the drawings. FIG. 4A is a perspective view illustrating an example of a schematic structure of an antenna device relating to other embodiment of the present invention, and FIG. 4B is a sectional view along line C-C of FIG. 4A.

Figure 4B:
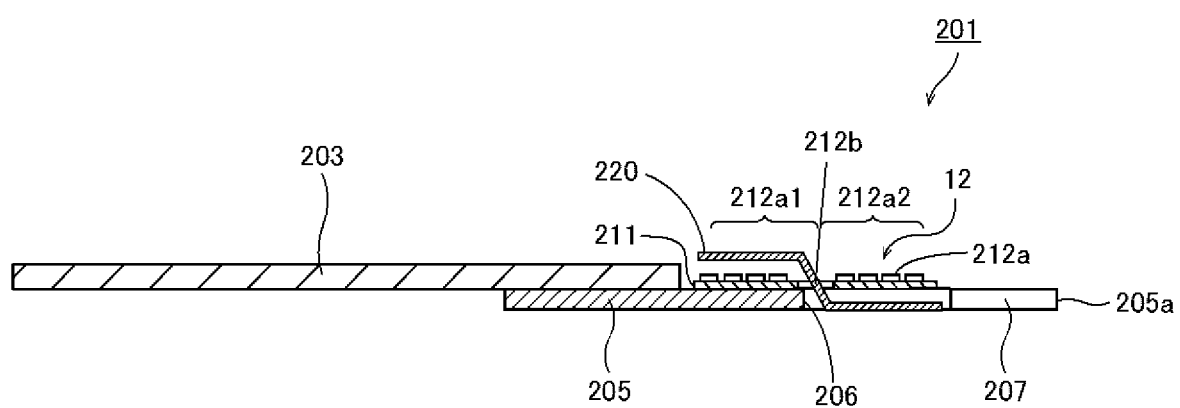
FIG. 4B is a sectional view along line C-C of FIG. 4A.

As illustrated in FIGS. 4A and 4B, an antenna device 201 of this embodiment comprises: an antenna coil 212 provided by winding around a conducting wire 212a such that conducting wires 212a opposing in width direction (Y direction) via an opening 212b will be close to each other; a sheet-like conductor 205 provided at a surface of the antenna coil 212 opposite to a surface of the antenna coil 212 opposing to an external device 40; and a metal plate 203 overlapped with one end side of the sheet-like conductor 205.

In this embodiment, the antenna coil 212 is an elongated approximately rectangular shaped coil divided into two parts, i.e. one side part 212a1 in which the conducting wire 212a is wound around in one direction and other side part 212a2 in which the conducting wire 212a is wound around in other direction, via a center line longitudinally traversing the opening 212b at center side. In addition, the antenna coil 212 is arranged such that a main surface in which the conducting wire 212a is wound around will be opposed to a reader/writer 40 in XY plane illustrated in FIG. 1 at the time of communication. Further, a magnetic sheet 220 formed from a magnetic substance is provided to be inserted into the opening 212b of the antenna coil 212 such that the magnetic sheet 220 is arranged at a position between the other side part 212a2 and a conductor side opening 206, and also, arranged to overlap with a surface of the one side part 212a1 opposing to the external device 40, in order to directly introduce magnetic flux from the external device 40 into the opening 212b of the antenna coil 212 easily.

The sheet-like conductor 205 is a metallic sheet having a size bigger than a contour of the antenna coil 212, and configured to be provided with the conductor side opening 206 having a size to overlap only with the other side part 212a2 of the antenna coil 212, and a slit 207 formed between the conductor side opening 206 and a tip of an outer edge 205a of the sheet-like conductor 205. In this embodiment, the sheet-like conductor 205 is a second conductor composed of aluminum foil or the like provided to bridge the antenna coil 212 and a first conductor composed of the metal plate 203 such as metal housing of battery pack, or metal cover provided at the electronic apparatus.

In other words, in this embodiment, it is configured to connect the antenna coil 212 with the metal plate 203 via the sheet-like conductor 205, in which the conductor side opening 206 and the slit 207 are formed, when arranging the antenna coil 212 at outer edge side of the metal plate 203 in the housing of a portable phone 30, in order to secure excellent communication characteristics with the reader/writer 40, by using characteristics that magnetic field is strong at outer edge side of the metal plate 203 opposing to the reader/writer 40.

The slit 207 is a narrow slit long in longitudinal direction with respect to width direction, and the slit 207 is formed to connect between the conductor side opening 206 and a tip of the outer edge 205a of the sheet-like conductor 205. By arranging the slit 207, a loop of eddy current flowing through the sheet-like conductor 205 at the time of communication will be shut off, so occurrence of eddy current is prevented, and it is possible to inhibit loss of magnetic flux passing through. In addition, it is fine as long as it is possible to prevent occurrence of eddy current at the sheet-like conductor 205, so width of the slit 207 is not limited. In addition, the slit 207 may be arranged to connect the conductor side opening 206 with any of the outer edge 205a of the sheet-like conductor 205, so the slit 207 may be configured to connect the conductor side opening 206 with any of both sides of the outer edge 205a of the sheet-like conductor 205.

As mentioned above, in this embodiment, the antenna device 201 is configured to provide the conductor side opening 206 having a size approximately equal to a size of the other side part 212a2 of the antenna coil 212 at a desired position of the sheet-like conductor 205, and also, to provide the slit 207 for connecting the conductor side opening 206 with the outer edge 205a of the sheet-like conductor 205, and further, to provide the antenna coil 212 at inner side of the sheet-like conductor 205 such that the other side part 212a2 of the antenna coil 212 is overlapped with the conductor side opening 206, and also, to connect the sheet-like conductor 205 to one end side of the metal plate 203. By configuring as the above, a loop is formed as magnetic flux from the reader/writer 40 passes through the conductor side opening 206 provided at the sheet-like conductor 205 along the magnetic sheet 220, so communication performance as antenna is improved.

In addition, by arranging the conductor side opening 206 at desired position of the sheet-like conductor 205, an operation point for contactless communication with the external device 40 such as reader/writer will be adjusted to be at a peak of coupling coefficient k between both coils, so it will be possible to secure higher communication performance. In other words, in this embodiment, by arranging the conductor side opening 206 at desired position of the sheet-like conductor 205 connected to one end side of the metal plate 203, which is the internal structure of the electronic apparatus 30, the operation point for contactless communication will be adjusted to be at a peak of coupling coefficient k between both coils, so higher communication performance is secured.

Especially, in this embodiment, it is configured that the conductor side opening 206 and the slit 207 are not provided directly at the metal plate 203, which is the internal structure of the electronic apparatus 30, and the conductor side opening 206 and the slit 207 are provided at thin sheet-like conductor 205 such as metal foil, for example aluminum foil. Therefore, it will be easier to adjust communication operation point of the antenna coil 212 to desired position, so it will be possible to secure higher communication performance surely. In addition, as the conductor side opening 206 and the slit 207 are not provided directly at the metal plate 203, which is the internal structure of the electronic apparatus 30, the strength of these internal structure will not be decreased, so it will be possible to secure higher communication performance.

In addition, in one embodiment and other embodiment of the present invention, in the antenna coil 12, 112, 212, the magnetic sheet 20, 120, 220 is arranged respectively, but even when the magnetic sheet 20, 120, 220 is not arranged, the present invention is having the above action and effect. In other words, as long as it is configured that the conductor side opening 6, 106, 206 and the slit 7, 107, 207 are provided at the sheet-like conductor 5, 105, 205, and that the other side part 12a2, 112a2, 212a2 of the antenna coil 12, 112, 212 is overlapped with the conductor side opening 6, 106, 206, it is possible to secure high communication performance as well.

Examples

Explaining about verification and evaluation of an antenna device relating to each embodiment of the present invention, using the drawings. An action and effect of the antenna device relating to each embodiment of the present invention was verified using the following examples 1 to 4 and comparative examples 1 and 2. In addition, the present invention is not limited to these examples.

Explaining about a basic verification and evaluation for confirming an effect relating to change of coupling coefficient with a reader/writer by providing a conductor side opening and a slit at the sheet-like conductor of the antenna device relating to one embodiment of the present invention, using the drawings.

Figure 5A:
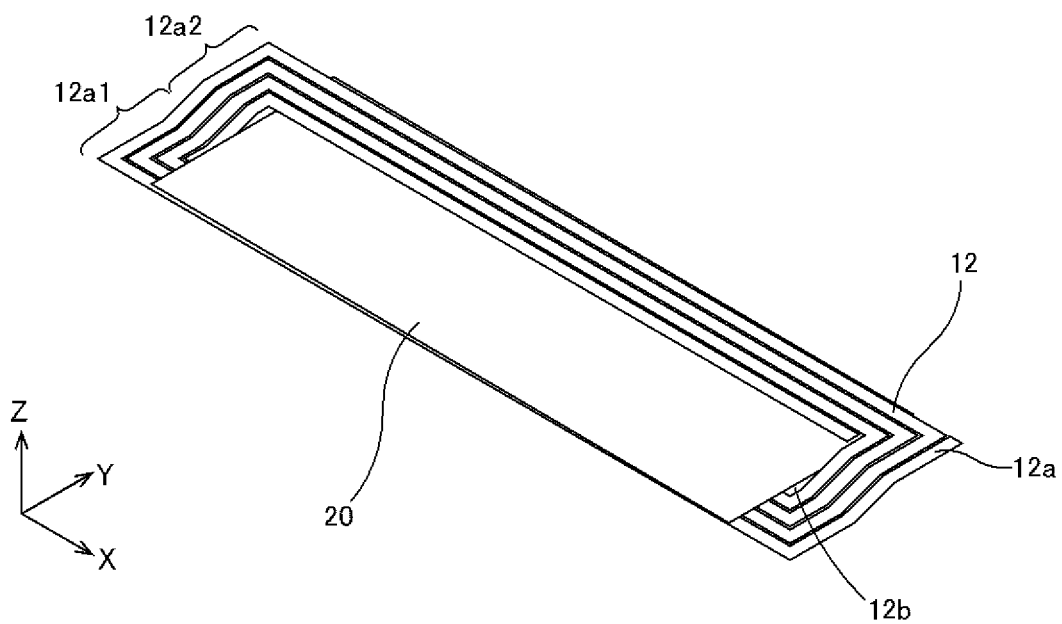
FIG. 5A is a perspective view illustrating an example of a schematic structure of a principal part of an antenna device as comparative example 1 of the antenna device relating to one embodiment of the present invention.
Figure 5B:
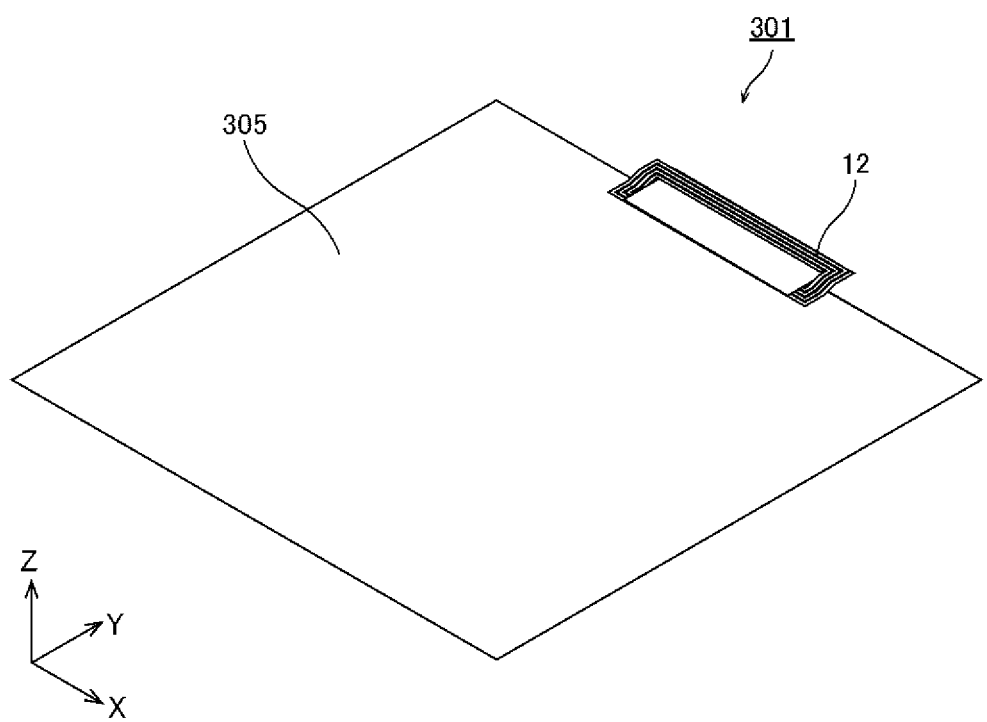
FIG. 5B is a perspective view illustrating an example of a schematic structure of the antenna device as the comparative example 1.
Figure 6A:
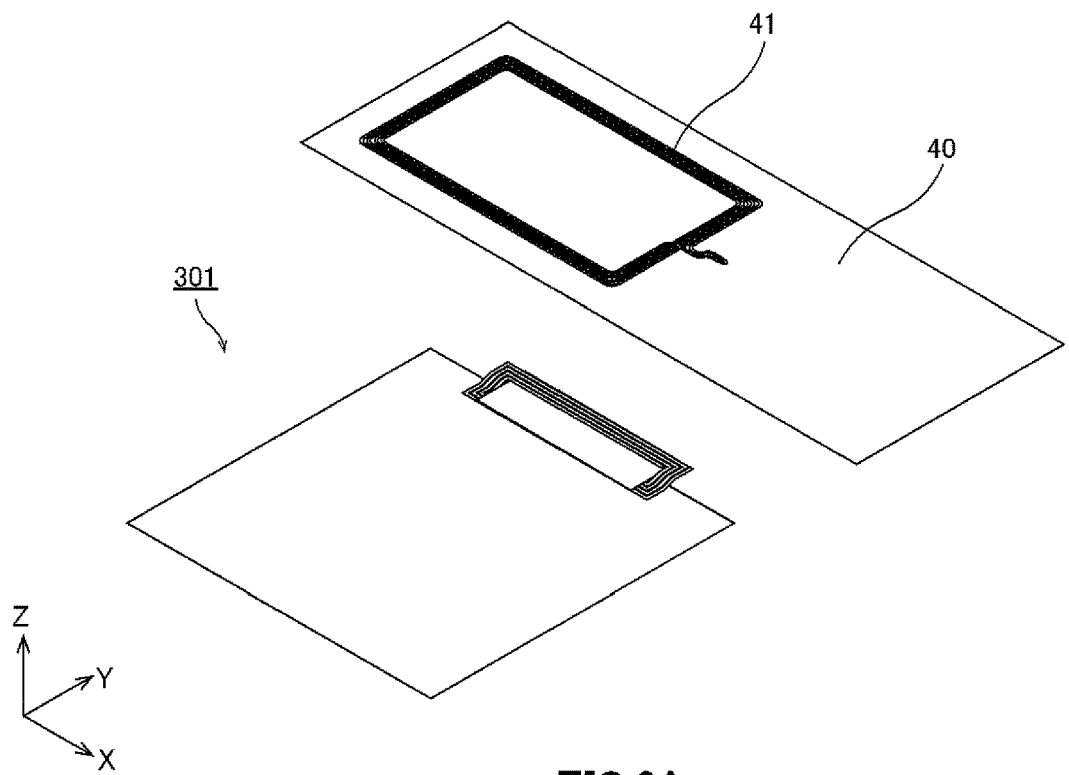
FIGS. 6A and 6B are explanatory views of an evaluation method for confirming action and effect of the antenna device relating to one embodiment of the present invention.
Figure 6B:
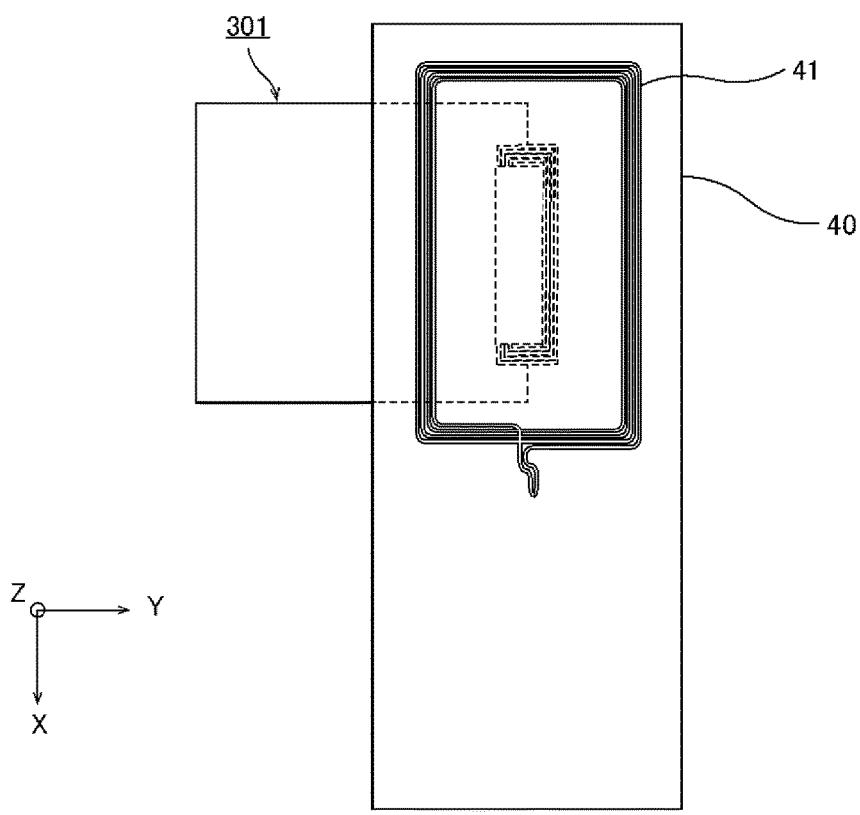
Figure 7A:
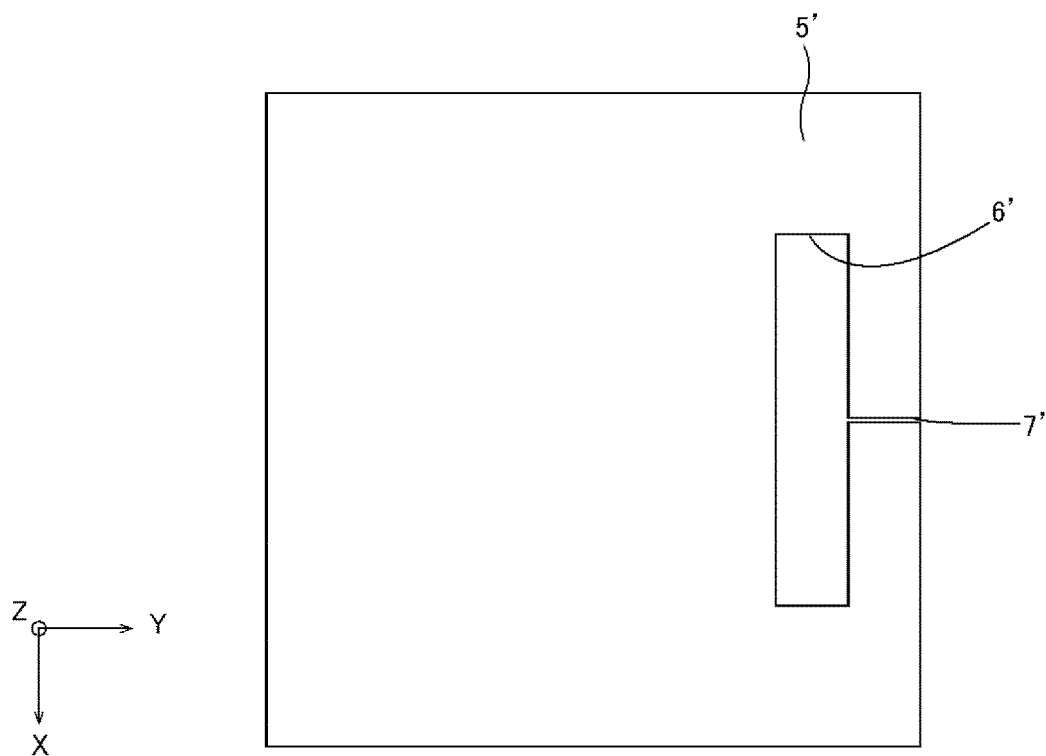
FIG. 7A is a perspective view illustrating a structure of a sheet-like conductor provided at example 1 of the antenna device relating to one embodiment of the present invention.
Figure 7B:
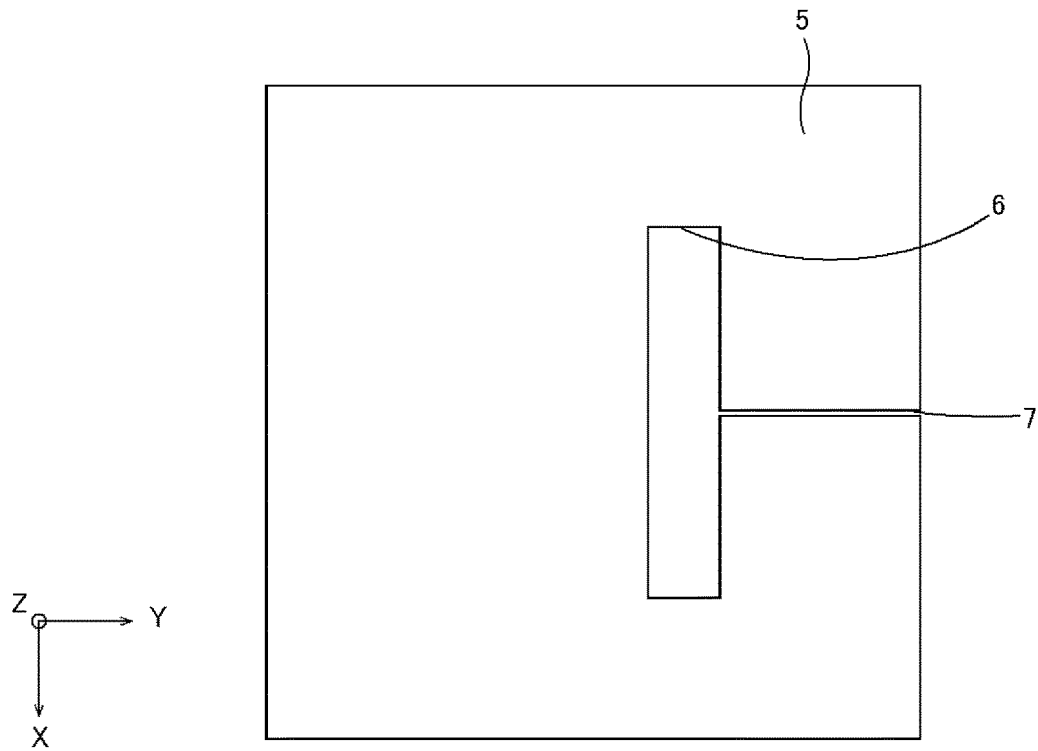
FIG. 7B is a perspective view illustrating a structure of a sheet-like conductor provided at example 2 of the antenna device relating to one embodiment of the present invention.
Figure 8:
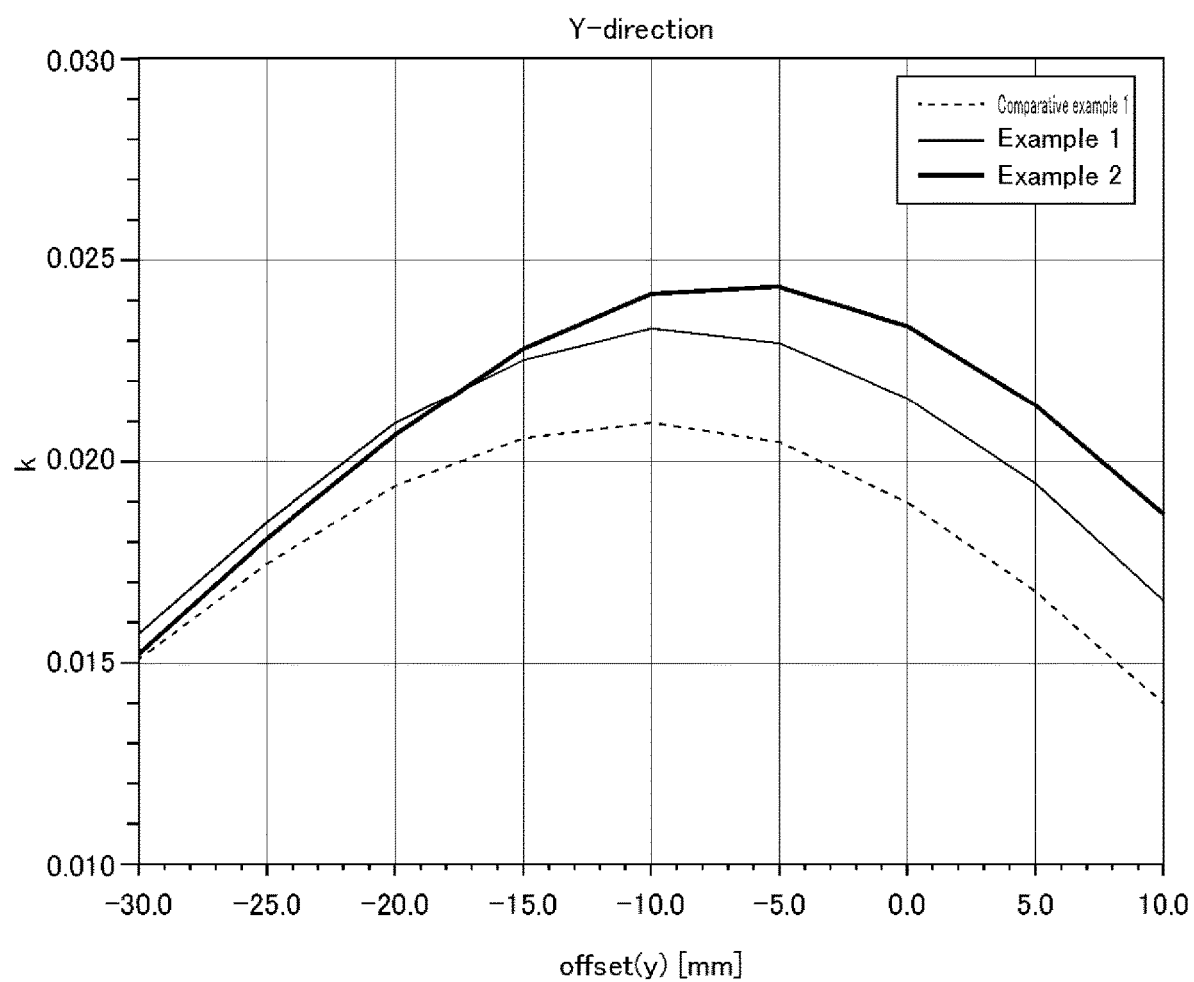
FIG. 8 is a graph illustrating an evaluation result of communication performance for confirming action and effect of the antenna device relating to one embodiment of the present invention.

FIG. 5A is a perspective view illustrating an example of a schematic structure of a principal part of an antenna device as comparative example 1 of the antenna device relating to one embodiment of the present invention, and FIG. 5B is a perspective view illustrating an example of a schematic structure of the antenna device as the comparative example 1. FIGS. 6A and 6B are explanatory views of an evaluation method for confirming action and effect of the antenna device relating to one embodiment of the present invention. FIG. 7A is a perspective view illustrating a structure of a sheet-like conductor provided at example 1 of the antenna device relating to one embodiment of the present invention, and FIG. 7B is a perspective view illustrating a structure of a sheet-like conductor provided at example 2 of the antenna device relating to one embodiment of the present invention. FIG. 8 is a graph illustrating an evaluation result of communication performance for confirming action and effect of the antenna device relating to one embodiment of the present invention.

In comparative example 1 as conventional example, as illustrated in FIGS. 5A and 5B, an antenna coil 12 is provided by winding around a conducting wire 12a such that conducting wires 12a opposing in width direction (Y direction) via an opening 12b will be close to each other, and the antenna coil 12 inserted with a magnetic sheet 20 in the opening 12b of the antenna coil 12 was arranged at an outer edge of a sheet-like conductor 305. Concretely, communication characteristics was evaluated by applying aluminum foil of 50 mm×50 mm×0.05 mm as the sheet-like conductor 305 around slim shaped NFC antenna (four-winding coil with contour of 30 mm×10 mm), which was formed by inserting the magnetic sheet 20 (ferrite sheet) into the opening 12b at center side of rectangular shaped antenna coil 12 composed of one side part 12a1 and other side part 12a2. As illustrated in FIGS. 6A and 6B, communication characteristics was evaluated by coupling coefficient k between an antenna device 301 and Listener-1, which is a reader/writer 40 defined by NFC Forum, with a distance between the antenna device 301 and an antenna 41 of the reader/writer 40 being 40 mm, and distribution of coupling coefficient k to be index of communication characteristics was evaluated by moving the reader/writer 40 in y axis direction.

On the other hand, in example 1 corresponding to an antenna device 1 relating to one embodiment of the present invention, as illustrated in FIG. 7A, in a sheet-like conductor 5' with a size same as the sheet-like conductor 305 in the comparative example 1, a conductor side opening 6' with a size almost same as other side part 12a2 of an antenna coil 12 and formed at inner side near outer edge of the sheet-like conductor 5', and a slit 7' connecting the conductor side opening 6' and the outer edge of the sheet-like conductor 5' were provided. And, the antenna coil 12 was arranged at inner side near the outer edge of the sheet-like conductor 5' such that the conductor side opening 6' of the sheet-like conductor 5' is overlapped with the other side part 12a2 of the antenna coil 12.

In addition, in example 2 corresponding to an antenna device 1 relating to one embodiment of the present invention, as illustrated in FIG. 7B, in a sheet-like conductor 5, a conductor side opening 6 with a size almost same as other side part 12a2 of an antenna coil 12 and formed at center side near a center of inner side of the sheet-like conductor 5, and a slit 7 connecting the conductor side opening 6 and outer edge of the sheet-like conductor 5 were provided. And, the antenna coil 12 was arranged at center side near a center of inner side of the sheet-like conductor 5 such that the conductor side opening 6 of the sheet-like conductor 5 is overlapped with the other side part 12a2 of the antenna coil 12. Also, with respect to these examples 1 and 2, distribution of coupling coefficient k to be index of communication characteristics was evaluated as well as the comparative example 1.

Evaluation result in these evaluation tests were illustrated in FIG. 8. As illustrated in FIG. 8, the examples 1 and 2 obtained higher coupling coefficient k than the comparative example 1 in which the slim antenna was arranged around the metal plate. From the above, it was understood that it is possible to secure antenna communication characteristics by more excellent magnetic shielding effect, by providing the conductor side opening at inner side of the metal plate, and also, by connecting the conductor side opening with the outer edge of the metal plate by the slit, and by overlapping the other side part of the antenna coil with the conductor side opening, than when the antenna coil is arranged at outer edge side of the metal plate. In addition, it was understood that it is possible to secure more excellent communication performance when the conductor side opening is arranged at center side near a center of the sheet-like conductor than when the conductor side opening is arranged at inner end of the metal plate, as higher coupling coefficient k can be obtained when the conductor side opening is arranged at center side near a center of the sheet-like conductor.

Next, explaining about basic verification and evaluation for confirming an effect relating to change of coupling coefficient with the reader/writer by providing the conductor side opening and the slit at the sheet-like conductor of the antenna device relating to other embodiment of the present invention, using the drawings.

Figure 9A:
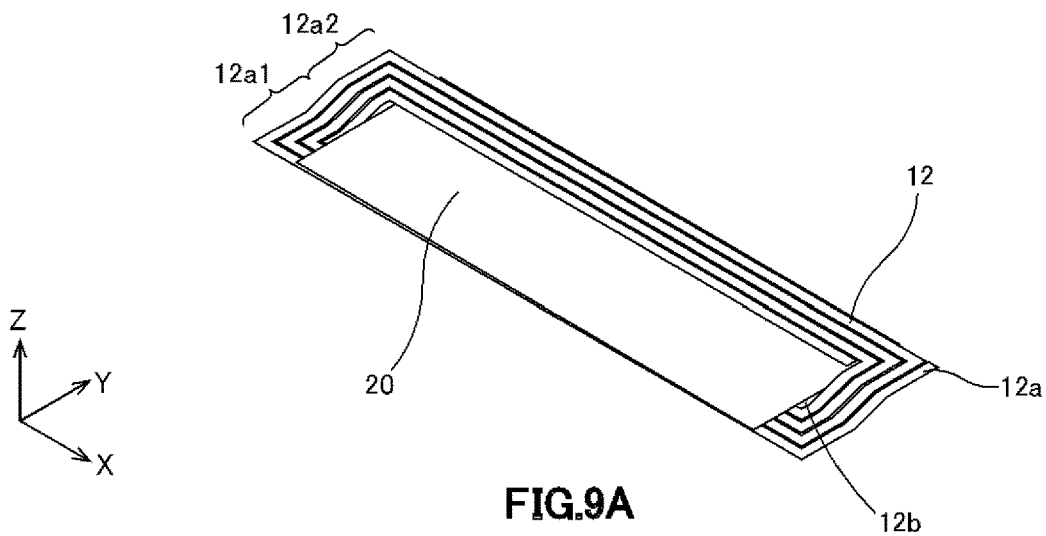
FIGS. 9A and 9B are perspective views illustrating an example of a schematic structure of a principal part of an antenna device as comparative example 2 of the antenna device relating to other embodiment of the present invention.
Figure 9B:
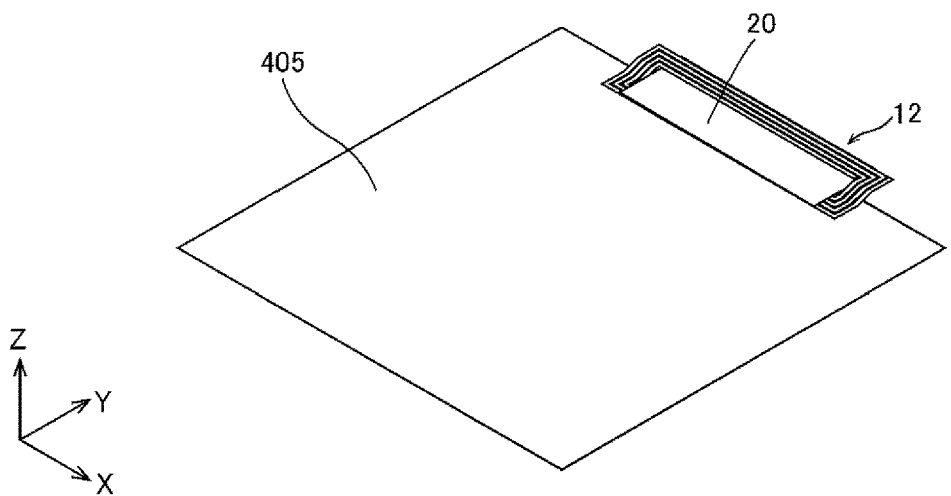
Figure 9C:
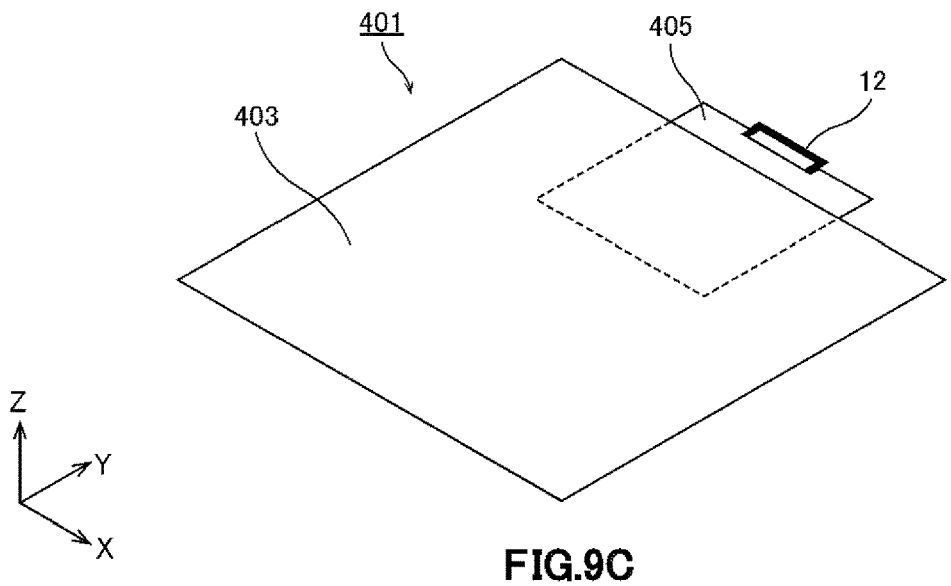
FIG. 9C is a perspective view illustrating an example of a schematic structure of an antenna device as comparative example 2 of the antenna device relating to other embodiment of the present invention.
Figure 10A:
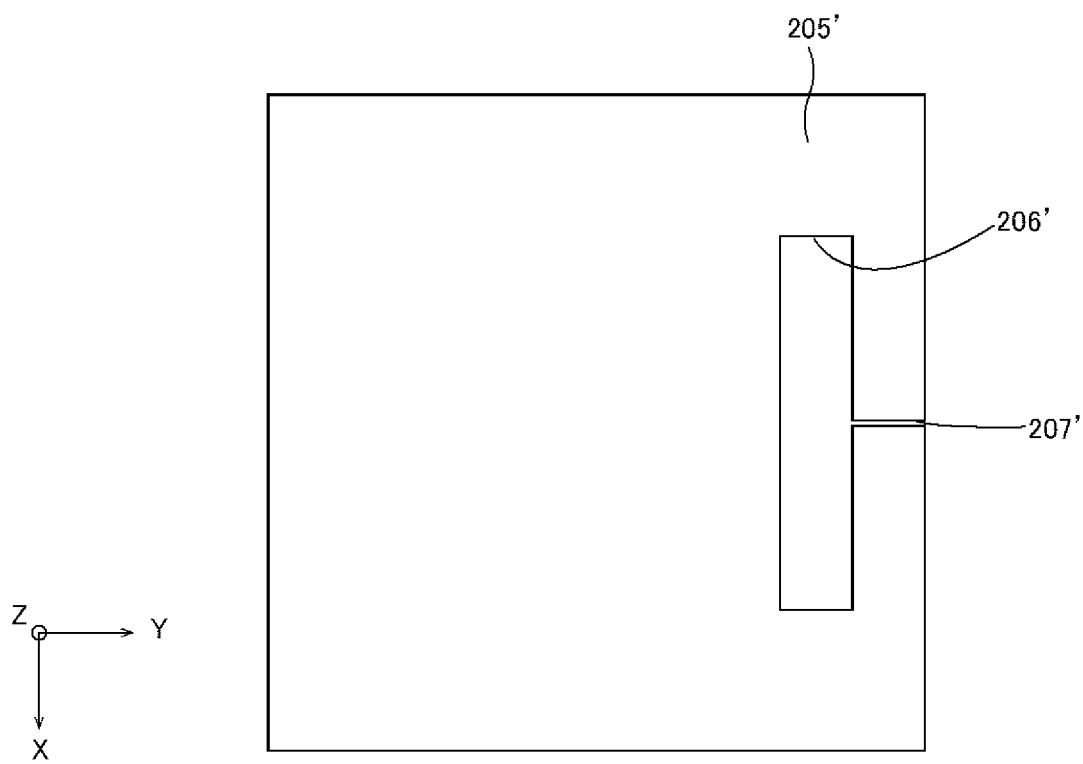
FIG. 10A is a plan view illustrating a structure of a sheet-like conductor of example 3 of the antenna device relating to other embodiment of the present invention.
Figure 10B:
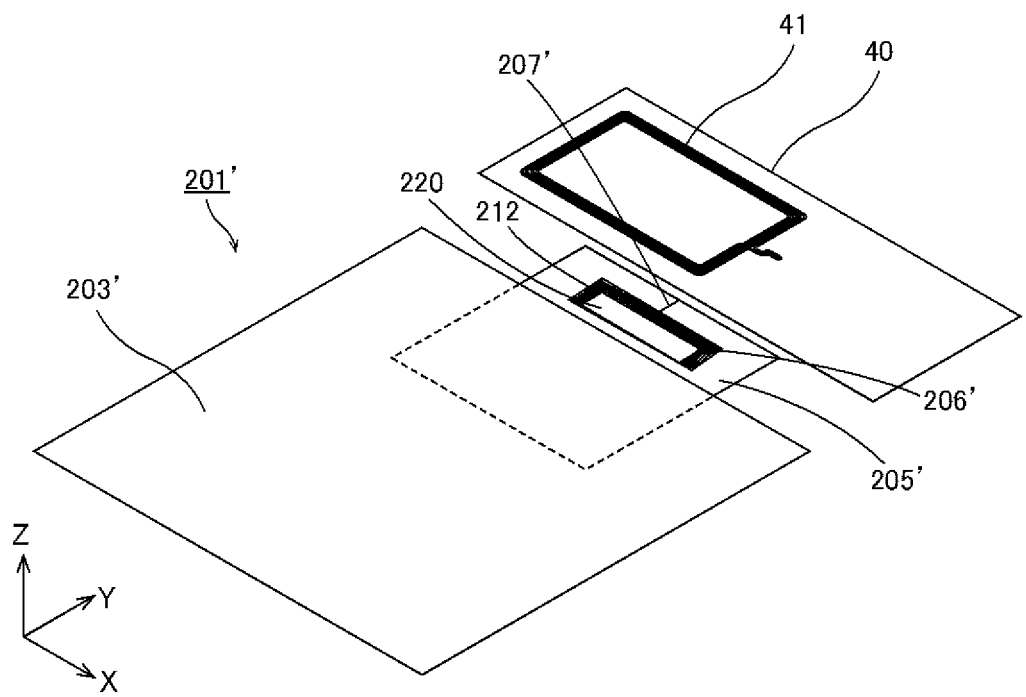
FIG. 10B is an explanatory view of an evaluation method for confirming action and effect of the example 3.
Figure 11A:
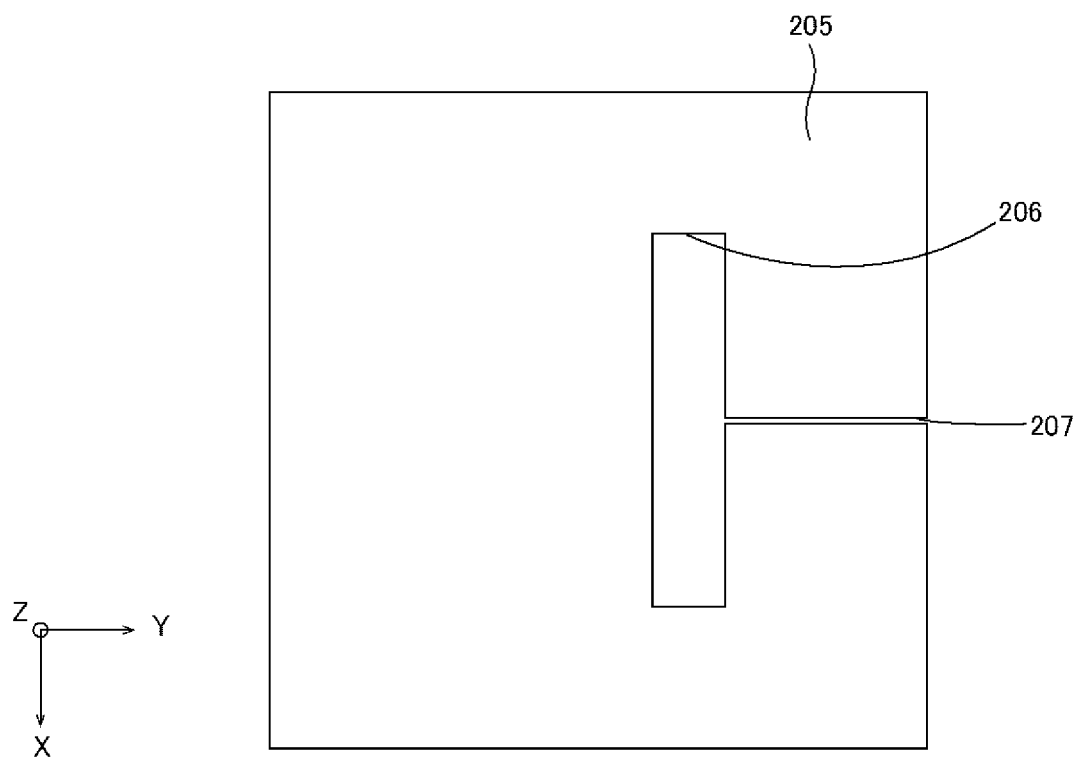
FIG. 11A is a plan view illustrating a structure of a sheet-like conductor of example 4 of the antenna device relating to other embodiment of the present invention.
Figure 11B:
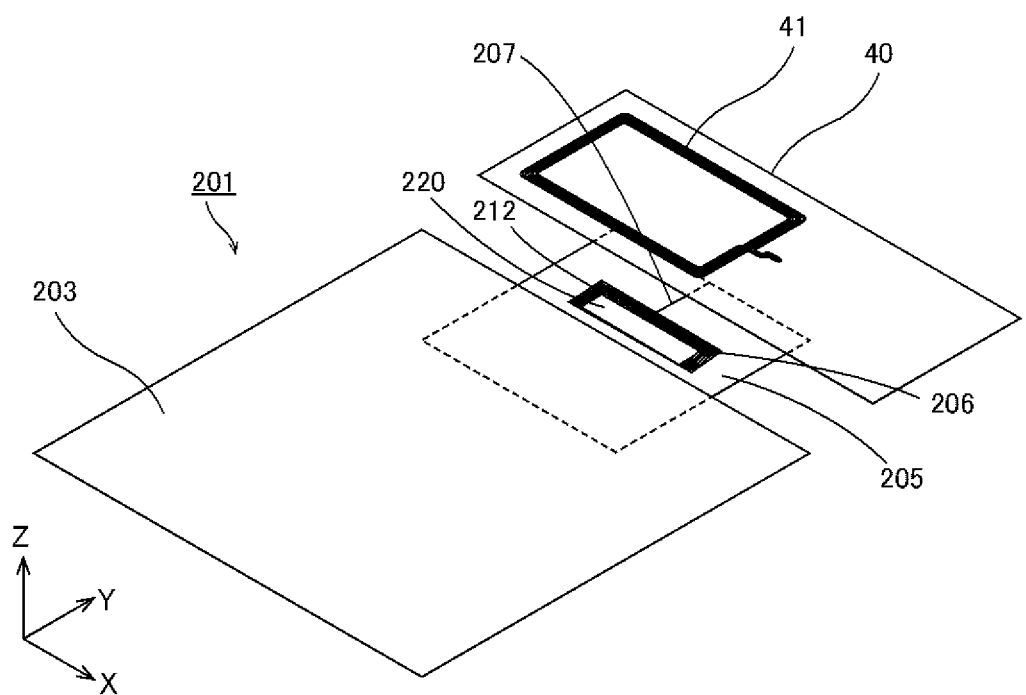
FIG. 11B is an explanatory view of an evaluation method for confirming action and effect of the example 4.
Figure 12:
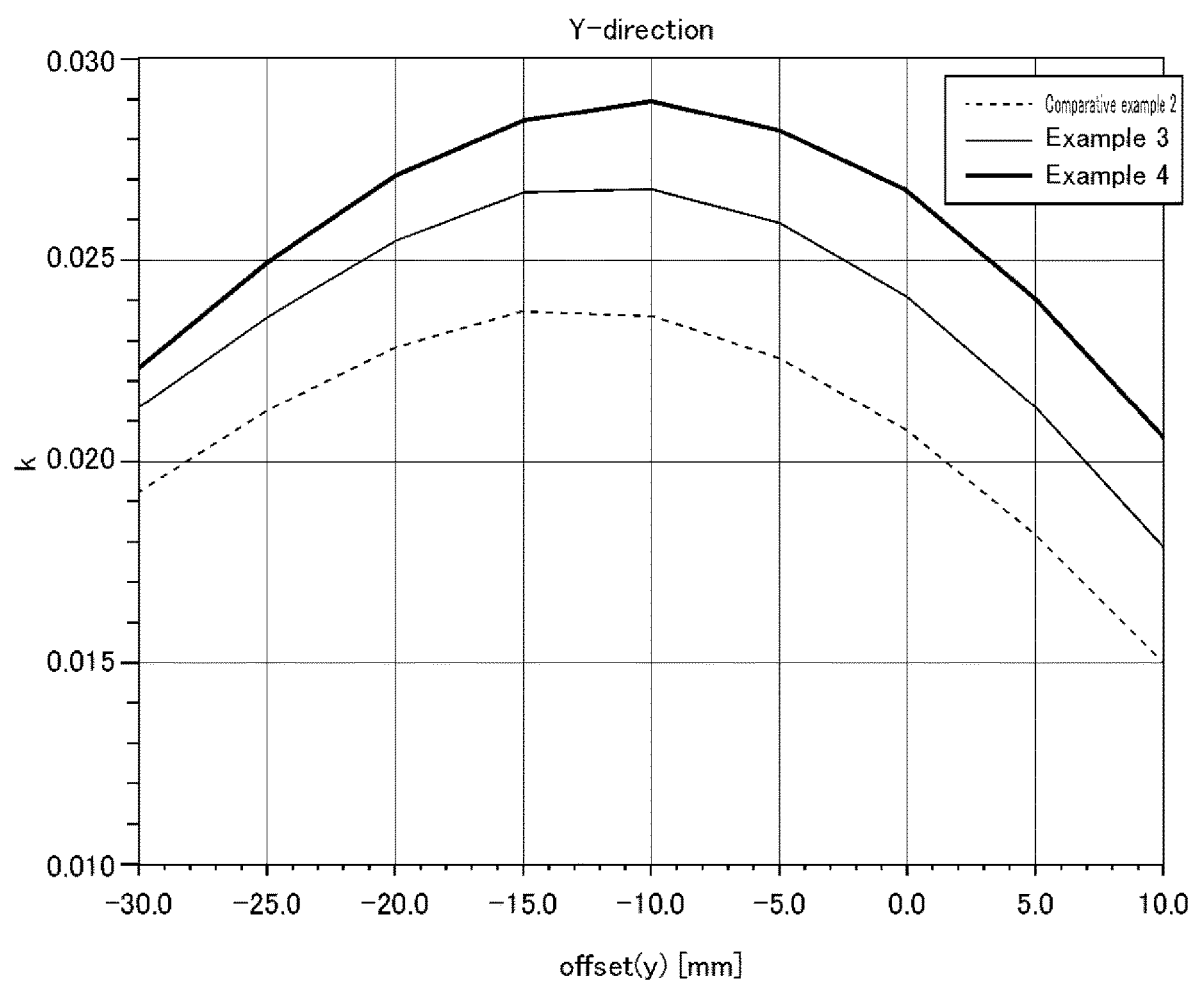
FIG. 12 is a graph illustrating an evaluation result of communication performance for confirming action and effect of the antenna device relating to other embodiment of the present invention.

FIGS. 9A and 9B are perspective views illustrating an example of a schematic structure of a principal part of an antenna device as comparative example 2 of the antenna device relating to other embodiment of the present invention, and FIG. 9C is a perspective view illustrating an example of a schematic structure of an antenna device as comparative example 2 of the antenna device relating to other embodiment of the present invention. FIG. 10A is a plan view illustrating a structure of a sheet-like conductor of example 3 of the antenna device relating to other embodiment of the present invention, and FIG. 10B is an explanatory view of an evaluation method for confirming action and effect of the example 3. FIG. 11A is a plan view illustrating a structure of a sheet-like conductor of example 4 of the antenna device relating to other embodiment of the present invention, and FIG. 11B is an explanatory view of an evaluation method for confirming action and effect of the example 4. FIG. 12 is a graph illustrating an evaluation result of communication performance for confirming action and effect of the antenna device relating to other embodiment of the present invention.

In comparative example 2 as conventional example, as illustrated in FIGS. 9A to 9C, an antenna coil is provided by winding around a conducting wire 12a such that conducting wires 12a opposing in width direction (Y direction) via an opening 12b will be close to each other, and the antenna coil 12 inserted with a magnetic sheet 20 in the opening 12b was arranged at an outer edge of a sheet-like conductor 405, and the sheet-like conductor 405 was connected to a first conductor 403 composed of a metal plate. Concretely, communication characteristics was evaluated by applying aluminum foil of 50 mm×50 mm×0.05 mm as the sheet-like conductor 405 around a slim shaped NFC antenna (four-winding coil with contour of 30 mm×10 mm) which is formed by inserting the magnetic sheet 20 (ferrite sheet) into the opening 12b provided at center side of rectangular shaped antenna coil 12 composed of one side part 12a1 and other side part 12a2, and further, by arranging the slim shaped NFC antenna near the metal plate 403 composed of SUS plate of 150 mm×150 mm×0.3 mm. As illustrated in the above-mentioned FIGS. 6A and 6B, communication characteristics was evaluated by coupling coefficient k between an antenna device 401 and Listener-1, which is a reader/writer 40 defined by NFC Forum, with a distance between the antenna device 401 and an antenna 41 of the reader/writer 40 being 40 mm, and distribution of coupling coefficient k to be index of communication characteristics was evaluated by moving the reader/writer 40 in y axis direction.

On the other hand, in an antenna device 201' of the example 3 corresponding to the antenna device 201 relating to other embodiment of the present invention, as illustrated in FIG. 10A, in a sheet-like conductor 205' with a size same as a size of the sheet-like conductor 405 of the comparative example 2, a conductor side opening 206' with a size almost same as other side part 212a2 (refer to FIG. 4B) of an antenna coil 212 with a size same as the other side part 12a2 of the comparative example 2 and formed at inner side near outer edge of the sheet-like conductor 205', and a slit 207' for connecting the conductor side opening 206' and the outer edge of the sheet-like conductor 205' were provided. And, the communication characteristics was evaluated by arranging the antenna coil 212 at inner side near outer edge of the sheet-like conductor 205' such that the conductor side opening 206' of the sheet-like conductor 205' is overlapped with the other side part 212a2 of the antenna coil 212, and further, by arranging the antenna coil 212 near the metal plate 203' of same material and size as the metal plate of the comparative example 2. As illustrated in FIG. 10B, communication characteristics was evaluated by coupling coefficient k between an antenna device 201' and Listener-1, which is a reader/writer 40 defined by NFC Forum, with a distance between the antenna device 201' and an antenna 41 of the reader/writer 40 being 40 mm, and distribution of coupling coefficient k to be index of communication characteristics was evaluated by moving the reader/writer 40 in y axis direction.

In addition, in example 4 corresponding to the antenna device 201 relating to one embodiment of the present invention, as illustrated in FIG. 11A, a sheet-like conductor 205 was provided with a conductor side opening 206 with a size almost same as other side part 212a2 (refer to FIG. 4B) of an antenna coil 212 formed at center side near a center of inner side of a sheet-like conductor 205, and a slit 207 for connecting the conductor side opening 206 with outer edge of the sheet-like conductor 205. And, communication characteristics was evaluated by arranging the antenna coil 212 at center side near a center of inner side of the sheet-like conductor 205 such that the conductor side opening 206 of the sheet-like conductor 205 is overlapped with the other side part 212a2 of the antenna coil 212, and further, by arranging the antenna coil 212 near the metal plate 203 of same material and size as the metal plate of the comparative example 2. As illustrated in FIG. 11B, communication characteristics was evaluated by coupling coefficient k between the antenna device 201 and Listener-1, which is a reader/writer 40 defined by NFC Forum, with a distance between the antenna device 201 and an antenna 41 of the reader/writer 40 being 40 mm, and distribution of coupling coefficient k to be index of communication characteristics was evaluated by moving the reader/writer 40 in y axis direction.

Evaluation result in these evaluation tests were illustrated in FIG. 12. As illustrated in FIG. 12, the examples 3 and 4 obtained higher coupling coefficient k than the comparative example 2 in which the slim antenna was arranged around the metal plate. From the above, it was understood that it is possible to secure antenna communication characteristics by more excellent magnetic shielding effect, by providing the conductor side opening at inner side of the sheet-like conductor, and also, by connecting the conductor side opening with the outer edge of the sheet-like conductor by the slit, and by overlapping the other side part of the antenna coil with the conductor side opening, than when the antenna coil is arranged at outer edge side of the sheet-like conductor. In addition, it was understood that it is possible to secure more excellent communication performance when the conductor side opening is arranged at center side near a center of the sheet-like conductor than when the conductor side opening is arranged at inner end of the sheet-like conductor, as higher coupling coefficient k can be obtained when the conductor side opening is arranged at center side near a center of the sheet-like conductor. Further, in the examples 3 and 4, coupling coefficient k was in bigger value than the examples 1 and 2, so it was understood that a significant effect to improve communication performance can be obtained even when area of conductor is small, by configuring that the sheet-like conductor is overlapped with the metal plate, more than providing the opening and the slit at the metal plate.

In addition, we have explained in detail about each embodiment and each example of the present invention as above, but it would be easy for those who skilled in the art to understand that various modifications are possible without substantively departing from new matters and effect of the present invention. Therefore, all of these modifications should be included in a scope of the present invention.

For example, terms described with different terms having broader or equivalent meaning at least once in description and drawings can be replaced with these different terms in any part of description and drawings. In addition, configuration and operation of the antenna device are also not limited to those explained in each embodiment and each example of the present invention and it can be performed with various modifications.

Glossary of Drawing References

1 Antenna device
2 Antenna module
3, 203 Metal plate (First conductor)
5, 105, 205 Sheet-like conductor
5a, 105a, 205a Outer edge (of sheet-like conductor)
6, 106, 206 Conductor side opening
7, 107, 207 Slit
11, 111, 211 Antenna substrate
12, 112, 212 Antenna coil
12a, 112a, 212a Conducting wire
12a1, 112a1, 212a1 One side part
12a2, 112a2, 212a2 Other side part
12b, 112b, 212b Opening
13 Communication processing unit
14 Terminal area
20, 120, 220 Magnetic sheet
30 Electronic apparatus
40 Reader/writer (External device)
41 Antenna
42 Control board
43 Control circuit
L1 Center line

The invention claimed is:

1. An antenna device incorporated in an electronic apparatus and being configured to communicate with an external device via an electromagnetic field signal, the antenna device comprising:
   an antenna coil inductively coupled to the external device, the antenna coil being formed by winding a conducting wire such that conducting wires opposing in width direction via an opening are close to each other; and
   a sheet-like conductor provided at an opposite surface of the antenna coil with respect to a surface of the antenna coil that is opposite to the external device, wherein
   the antenna coil is divided into: (i) a first side part in which the conducting wire is wound around in a first direction, and (ii) a second side part in which the conducting wire is wound around in a second direction, via a center line longitudinally traversing the opening,
   the sheet-like conductor is provided with: (a) a conductor side opening overlapping only with the second side part of the antenna coil, and (b) a slit formed between the conductor side opening and any outer edge of the sheet-like conductor, and
   the conductor side opening has a size that is approximately the same as a size of the second side part of the antenna coil.

2. The antenna device according to claim 1, wherein the conductor side opening is provided at center side near a center of the sheet-like conductor.

3. The antenna device according to claim 2, wherein the sheet-like conductor is a second conductor bridging the antenna coil and a first conductor composed of a metal plate provided at the electronic apparatus.

4. The antenna device according to claim 3, wherein a magnetic sheet formed from a magnetic substance is arranged at a position between the second side part of the antenna coil and the conductor side opening.

5. The antenna device according to claim 2, wherein the sheet-like conductor is configured as a part of a metal plate provided at the electronic apparatus.

6. The antenna device according to claim 5, wherein a magnetic sheet formed from a magnetic substance is arranged at a position between the second side part of the antenna coil and the conductor side opening.

7. The antenna device according to claim 2, wherein a magnetic sheet formed from a magnetic substance is arranged at a position between the second side part of the antenna coil and the conductor side opening.

8. The antenna device according to claim 1, wherein the sheet-like conductor is a second conductor bridging the antenna coil and a first conductor composed of a metal plate provided at the electronic apparatus.

9. The antenna device according to claim 8, wherein a magnetic sheet formed from a magnetic substance is arranged at a position between the second side part of the antenna coil and the conductor side opening.

10. The antenna device according to claim 1, wherein the sheet-like conductor is configured as a part of a metal plate provided at the electronic apparatus.

11. The antenna device according to claim 10, wherein a magnetic sheet formed from a magnetic substance is arranged at a position between the second side part of the antenna coil and the conductor side opening.

12. The antenna device according to claim 1, wherein a magnetic sheet formed from a magnetic substance is arranged at a position between the second side part of the antenna coil and the conductor side opening.

13. The antenna device according to claim 12, wherein the magnetic sheet is arranged also at a surface side of the first side part of the antenna coil opposing to the external device.

14. The antenna device according to claim 13, wherein
   the magnetic sheet is arranged at the position between the second side part of the antenna coil and the conductor side opening, and
   the magnetic sheet is arranged to overlap with a surface of the first side part of the antenna coil opposing to the external device, by inserting the magnetic sheet into the opening of the antenna coil.

* * * * *